United States Patent [19]
Budd et al.

[11] Patent Number: 4,950,889
[45] Date of Patent: Aug. 21, 1990

[54] CHROMATIC AND MISALIGNMENT COMPENSATION IN A MULTIPLE BEAM LASER SCANNING SYSTEM

[75] Inventors: Russell A. Budd, Longmont; Bruce D. Gibson, Louisville; Sherwood Kantor, Boulder; Wayne A. Overby; Mikel J. Stanich, both of Longmont, all of Colo.

[73] Assignee: International Business Machines Corporation, Armonk, N.Y.

[21] Appl. No.: 388,537

[22] Filed: Aug. 1, 1989

[51] Int. Cl.⁵ .............................................. H01J 3/14
[52] U.S. Cl. .................................... 250/236; 346/160
[58] Field of Search .............................. 250/234–236; 346/108, 160; 358/471

[56] References Cited

U.S. PATENT DOCUMENTS

| | | | |
|---|---|---|---|
| 4,046,471 | 9/1977 | Brauhann | 346/160 |
| 4,053,898 | 10/1977 | Hirayama et al. | 346/108 |
| 4,059,833 | 11/1977 | Kitamura | 346/108 |
| 4,253,102 | 2/1981 | Kataoka et al. | 346/108 |
| 4,393,387 | 7/1983 | Kitamura | 346/108 |
| 4,404,571 | 9/1983 | Kitamura | 346/108 |
| 4,420,761 | 12/1983 | Kitamura | 346/108 |
| 4,423,426 | 12/1983 | Kitamura | 346/108 |
| 4,424,442 | 1/1984 | Kitamura | 250/236 |
| 4,443,695 | 4/1984 | Kitamura | 250/205 |
| 4,445,126 | 4/1984 | Tsukada | 346/108 |
| 4,467,334 | 8/1984 | Anzai et al. | 346/160 |
| 4,566,043 | 1/1986 | Tamura | 358/300 |
| 4,739,415 | 4/1988 | Toyono et al. | 358/296 |
| 4,806,951 | 2/1989 | Arimoto et al. | 346/108 |

Primary Examiner—David C. Nelms
Assistant Examiner—Stephone B. Allen
Attorney, Agent, or Firm—Charles E. Rohrer

[57] ABSTRACT

This is an electronic scheme for correcting for mechanical misalignment and chromatic aberrations from laser beam to laser beam in the scan direction of a multiple beam laser scanning system for use in an electrophotographic machine. Each beam is first corrected for mechanical misalignment and thereafter for chromatic aberrations. A reference laser beam produces two pulses near the start of scan (SOS) and two pulses near the end of scan (EOS). A non-reference laser beam then produces SOS and EOS pulses from which the mechanical misalignment is calculated. A gated clock is energized by the reference pulse and a tapped delay line is used for nanosecond resolution. After accomplishing correction for mechanical misalignment, chromatic aberrations are corrected by measuring the amount of total pel displacement of the non-reference scan line relative to the reference scan line and inserting appropriate delays at selected intervals throughout the non-reference scan in order to maintain pel placement accuracy to a desired tolerance.

21 Claims, 4 Drawing Sheets

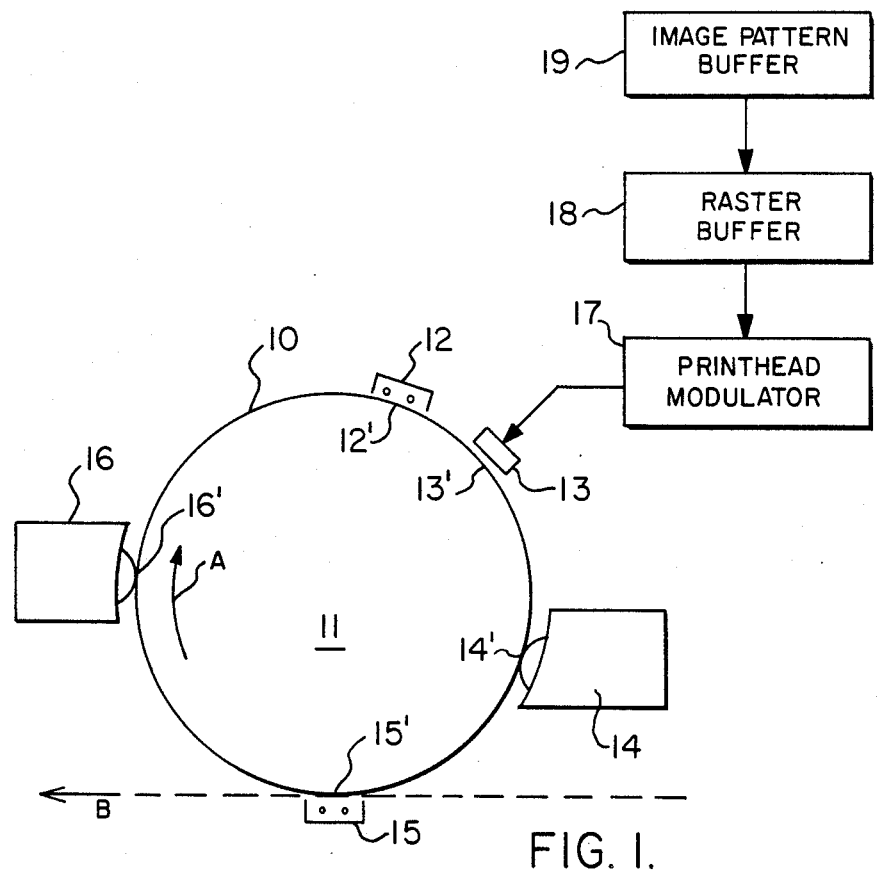
FIG. 1.
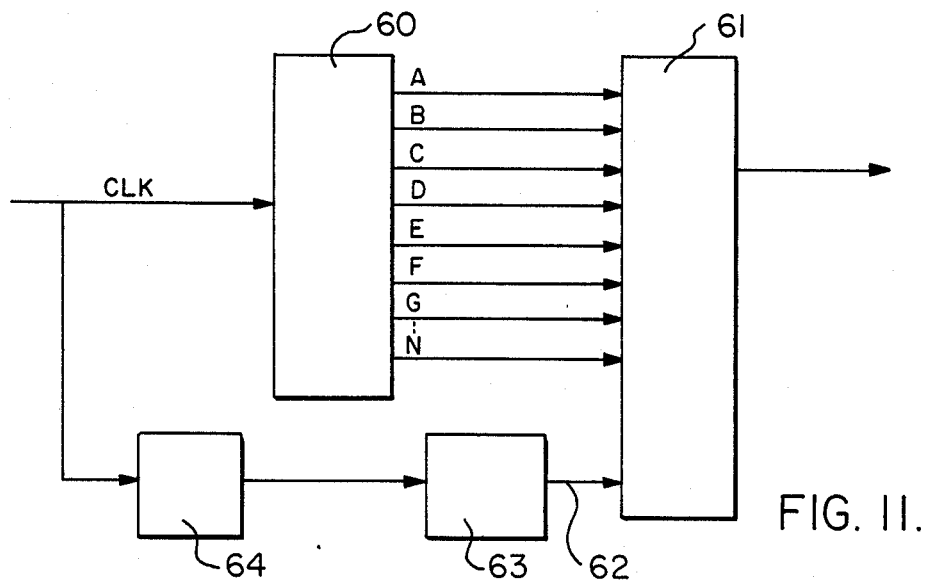
FIG. II.

CHROMATIC AND MISALIGNMENT COMPENSATION IN A MULTIPLE BEAM LASER SCANNING SYSTEM

This invention relates to multiple beam laser scanning systems and more particularly to electronic compensation for picture element (pel) placement errors caused by mechanical misalignment and wavelength (chromatic) variations.

RELATED PATENT APPLICATIONS

IBM Serial # 445085, filed concurrently herewith, relates to optical means for correcting pel placement errors due to chromatic aberrations. IBM Ser. No. 388,534, also filed concurrently herewith, relates to the inclusion of electrical propagation delays into the errors caused by mechanical misalignment.

BACKGROUND OF THE INVENTION

Multiple beam lasing systems can be used in a variety of applications, one of which is in a printing system where rotating polygonal mirrors are used to scan the light beams across a photoreceptive surface. The use of multiple laser beams in a printing system provides the capability of producing more than one line of information at a time, thus enabling high pel resolution, for example, 480 pels per inch or higher while keeping practical speeds for the rotating polygonal mirror. Multiple beam devices provide other capabilities as well; that is, the multiple beams can be used to alter the shape of the effective writing spot by modulating the spots within the spot group or they can be used to modulate the amount of light provided at each pel position.

While the use of multiple beam lasing systems have significant advantages over a single beam lasing system, multiple beam systems employing discrete laser sources or employing laser array chips require precise mechanical alignment to assure that a print position (pel location) is properly located from line to line, that is, that a pel written by one laser is properly aligned with a pel written by another laser. Multiple beam systems which employ laser arrays require that the lasing diodes be placed on the chip to close tolerance, nevertheless, there can be some physical misplacement of the semiconductor laser diodes within the chip making it desirable to provide a system which can utilize laser arrays with some laser spot variation. Additionally, laser array chips are typically mounted in a tilted fashion to provide correct beam alignment in the non-scan direction. However, the tilt creates an offset from beam to beam in the scan direction creating pel placement problems. As used herein, the term mechanical misalignment includes: (1) physical variation in the placement of lasing spots on a laser array chip; (2) mechanical misalignment of the laser array chip or of discrete lasing sources within a machine; and (3) the offset produced by tilting a laser array.

Still another problem with multiple beam lasing systems is wavelength variation from laser beam to laser beam. In laser arrays, wavelength variation is often within a few nanometers, but can be significant enough to create pel placement problems. In addition, it is desirable to utilize laser arrays with a wider range of wavelength variation in order to produce low cost systems. Such considerations are also true of multiple beam systems utilizing discrete laser sources. In any event, even if lasing sources are carefully matched, temperature and age can create dynamic wavelength variation which can destroy the accuracy of the system. It should be noted, that laser beam position is typically amplified through printhead optics, such that a small misalignment at the laser chip or a small wavelength variation can result in a much larger error at the focal plane.

Electronic correction schemes in the prior art have been designed to achieve multiple pel corrections for misalignments due to a necessary tilting of a laser array. Additionally, some of these electronic schemes provide sub-pel accuracy Such systems require nanosecond capability when high resolution systems are contemplated, that is, 480 pels per inch or higher. Clock frequencies of $500 \times 10^6$ Hz are required to resolve to two nanoseconds. Such a clock and the high speed logic utilizing such resolution are expensive.

It is an object of this invention to provide an electronic correction scheme for use with a multiple beam scanning laser system to provide correction for mechanical misalignment errors.

It is also an object of this invention to provide an electronic correction scheme for use with a multiple beam scanning laser system to provide correction for chromatic errors.

It is another object of this invention to quantify misalignment errors separately from chromatic errors in order that the two types of errors can be separately compensated.

It is an object of this invention to provide a multiple beam printhead such that proper chromatic operation is achieved while utilizing lasing sources of significantly different wavelength.

It is still another object of this invention to provide an electronic correction scheme utilizing relatively low clock frequencies, but providing correction resolution to within one or two nanoseconds.

It is still another object of this invention to provide a chromatic correction scheme which adjusts the clock across the entire scan.

It is still another object of this invention to provide an electronic correction scheme which is adaptive to dynamic variations in wavelength which may occur due to temperature or age.

SUMMARY OF THE INVENTION

This invention relates to electronic correction for chromatic aberrations and mechanical misalignment problems within a multiple beam laser printhead by separating the chromatic aberrations from the misalignment problems and providing separate correction techniques for each type of error. A constant adjustment is made to each pel position in a given scan line to correct for mechanical misalignment while delays are inserted into the scan line at intervals to correct for chromatic aberrations. Sub-pel correction is achieved for both mechanical misalignment and chromatic aberrations through the use of tapped delay lines.

The invention is advantageously practiced by selecting one of the laser beams as a reference beam and aligning pels produced by the other beams to the pels produced by the reference beam. To do that, the mechanical misalignment must be corrected; a start reference pulse is produced by the reference beam followed by a reference beam start of scan (SOS) pulse. Similarly, the reference beam is used to generate an end reference pulse and an end of scan (EOS) pulse. The time period $T_{nom_1}$ is measured between the start reference pulse and the SOS pulse and the time period $T_{nom_2}$ is measured between the end reference pulse and the EOS pulse. Next, a non-reference laser is energized to produce a second SOS pulse and a second EOS pulse. The time period $T_1$ is measured between the start reference pulse and the second SOS pulse and the time period $T_2$ is measured between the end reference pulse and the second EOS pulse. Thereafter, the mechanical offset of the non-reference beam is calculated according to the relationship:

$$\text{Offset} = \frac{(T_{nom_2} - T_2) + (T_{nom_1} - T_1)}{2}$$

The start of scan for the non-reference beam is then altered to compensate for the offset and thereby produce aligned pels at the center of process.

Chromatic aberrations can cause misalignment of pels during the scan even though the center of process pels are aligned. Therefore, the next step is to measure the displacement time between the reference beam SOS signal and the non-reference beam SOS signal. An appropriate delay can then be inserted to align the two SOS signals and additional delays can be inserted at selected intervals throughout the non-reference scan to maintain pel placement alignment at a desired tolerance.

BRIEF DESCRIPTION OF THE DRAWINGS

The above-mentioned objects and other features and objects of this invention, and the manner of attaining them will become more apparent and the invention itself will best be understood by reference to the following description of embodiments of the invention taken in conjunction with the accompanying drawing, the description of which follows.

FIG. 1 is a diagrammatic representation of an electrophotographic machine.

FIGS. 10 and 11 illustrate the circuits used for correcting chromatic aberrations.

DETAILED DESCRIPTION

Figure 2:
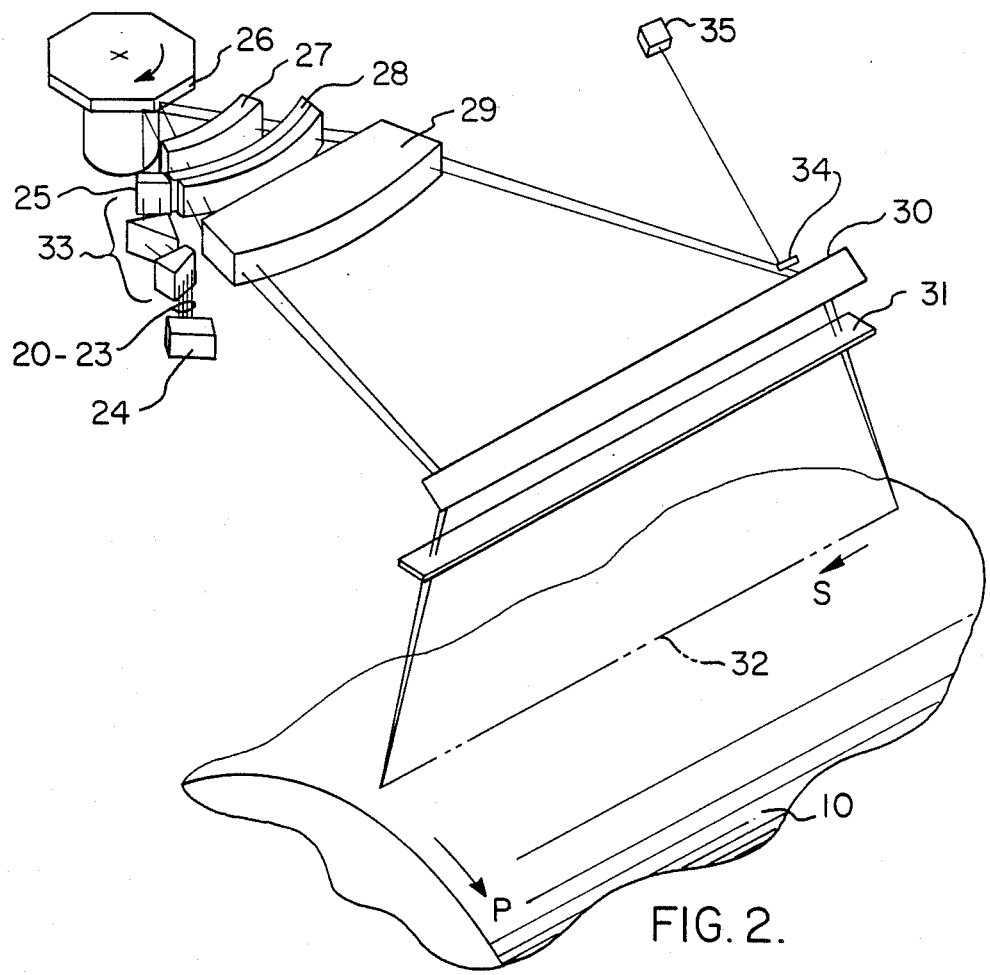
FIG. 2 shows a laser array optical system for use in the machine of FIG. 1.

The application of this invention can be illustrated within the framework of electrophotographic machines wherein prints are produced by creating an image of the subject on a photoreceptive surface, developing the image, and then fusing the image to paper or other print receiving material. In most electrophotographic machines the electrophotographic process is of the transfer type where photoreceptive material is placed around a rotating drum or arranged as a belt to be driven by a system of rollers. In the typical transfer process, photoreceptive material is passed under a stationary charge generating station to place a relatively uniform electrostatic charge, usually several hundred volts, across the entirety of the photoreceptive surface. Next, the photoreceptor is moved to an imaging station where it receives light rays from a light generating source which will discharge the photoreceptor to relatively low levels when the light source is fully powered, while the photoreceptor will continue to carry high voltage levels when the light source is turned off, or when it is powered at intermediate levels or for a relatively short duration. In that manner, the photoreceptive material is caused to bear a charge pattern which corresponds to the printing, shading, etc., which is desired to be printed on the receiving material.

Light generating sources in an electrophotographic printer are frequently comprised of lasing means in which the beam is modulated by a character generator to control the power or the length of time that a beam exposes the photoconductor in a particular pel area. In a multiple beam lasing system, character generators may modulate more than one beam at a time, so that more than one line of pels may be written at a time.

After producing an image on the photoreceptor, the image is moved to a developing station in the machine where developing material called toner is placed on the image. This material is usually in the form of a powder which carries a charge designed to cause the powder to deposit on selected areas of the photoreceptor.

The developed image is moved from the developer to a transfer station where the copy receiving material, usually paper, is juxtaposed to the developed image and a charge is placed on the backside of the paper so that when it is stripped from the photoreceptor the toner material is held on the paper and removed from the photoreceptor.

The remaining process steps are for permanently bonding toner material to the copy paper and cleaning residual toner left on the photoreceptor so that it can be reused.

FIG. 1 shows a typical electrophotographic machine such as would be used to implement this invention. Photoreceptive material 10 is placed on the surface of a drum 11 which is driven by motive means, not shown, to rotate in the direction A. A charge generator 12 places a uniform charge of several hundred volts across the surface of the photoreceptor at charging station 12'. The charged photoreceptor is mounted in a dark enclosure, not shown, and rotates to a printhead 13 which is comprised of a light generating source, such as a multiple beam laser generator. The light source selectively exposes the charged photoreceptor at imaging station 13' to discharge it in areas which are desired to be developed (Discharged Area Development, DAD process), or discharge it in areas which are to remain free of toner (Charged Area Development, CAD process).

For a DAD process, the discharged areas of the photoreceptor are developed at developing station 14' by developer apparatus 14 which applies toner so that the photoreceptor carries a visually perceptible image of the data. In a CAD process, the charged areas are developed. In either case, the developed image rotates to transfer station 15' where print paper, moving in the direction B, is juxtaposed with the surface of the photoreceptor. A charge opposite in polarity to the charge on the toner is placed on the backside of the print paper by transfer charge generator 15 such that when the paper is stripped from the surface of the photoreceptor, toner will be attracted to the paper and leave the surface of photoreceptor 10. Any remaining residual toner is cleaned from the photoreceptor at cleaning station 16' by cleaning apparatus 16.

The selective application of light rays to the photoreceptor 10, at imaging station 13', is accomplished through printhead modulator means 17. For a semiconductor laser diode, the printhead modulator is comprised of a power supply, which will either turn the light source on for longer or shorter periods of time to accomplish varying degrees of photoreceptor discharge in accordance with the pattern data, or it will turn the light-generating source on to a greater or lesser illumination intensity in accordance with that data. In any event, modulation will occur in accordance with that data contained in memory 19. That data is sent to a raster buffer 18 and on to the printhead modulator 17.

Figure 3:
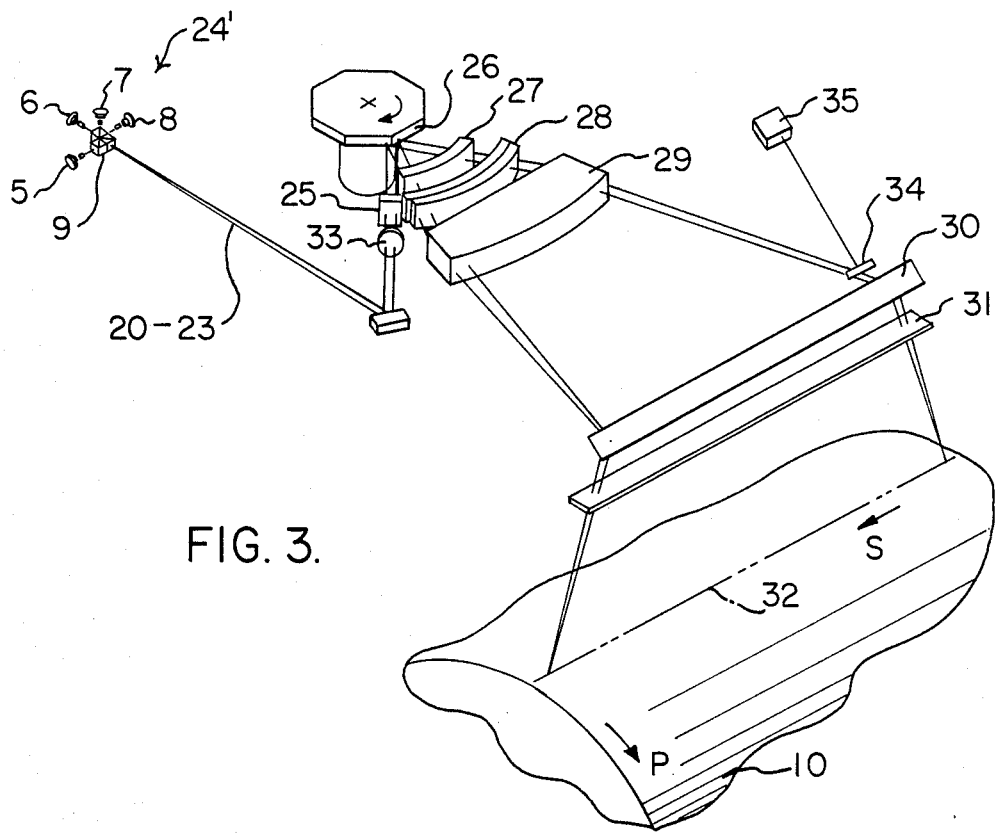
FIG. 3 shows a discrete lasing source optical system for use in the machine of FIG. 1.

FIGS. 2 and 3 show optical scanning systems which can be used in the machine of FIG. 1. Either of these can be utilized in printhead 13. In the multiple beam system illustrated in FIG. 2, four (4) nearly coaxial laser beams 20-23 are shown emanating from a multiple beam laser array module 24. FIG. 3 shows a laser beam module 24' which has four (4) discrete laser chips 5-8 whose laser beams 20-23 are passed through beam combining optics 9. In either system, the four (4) laser beams 20-23 are passed through a cylindrical lens 25 for focusing each of the beams onto the facets 26 of a rotating polygonal mirror. The beams are reflected from the rotating mirror through a negative spherical lens group 27, anamorphic lens group 28, and a positive spherical lens group 29, and onto the surface of photoreceptor 10. FIGS. 2 and 3 show a fold mirror 30, an exit window 31, the length 32 of the scan across photoreceptor 10, and beam expanding or collimating optics 33. A reflective surface 34 is provided to reflect light from each laser beam to photodetector 35 in order to derive start of scan (SOS) signals. A similar arrangement can be used for generating end of scan (EOS) signals or a reflective surface can direct the end of scan light beam back to detector 35 so that the same detector can be used for generating both SOS and EOS signals.

Figure 4:
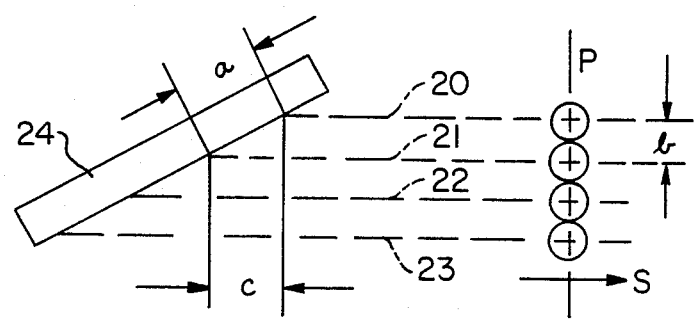
FIG. 4 is a diagrammatic representation showing a laser array tilted to produce proper pel alignment in the process direction, but thereby creating improper pel alignment in the scan direction unless corrected. Corrected pel placement is shown.

FIG. 4 is an illustration of the need to tilt laser array module 24 in order to provide proper pel placement in the process direction P. At a resolution of 480 pels per inch, pels must be placed at 480th of an inch intervals (b dimension in FIG. 4). The lasing spots on the array 24 would require a similar close spacing in order to locate the laser array 24 parallel to the axis P of the process direction. However, it is not practical to manufacture laser arrays to such tight tolerances. Therefore, array 24 is tilted, as shown in FIG. 4, at an angle such that the lasing spots can be separated a distance a greater than b and still produce pels which are properly spaced a distance b. In so doing, the lasing spots are offset a distance c in the scan direction S. Therefore, it is necessary in laser array systems to electronically offset the start of printing in the scan direction between laser beams in order to mate pel locations properly.

While discrete laser sources do not have the tilt induced problem described above with respect to laser arrays, it is difficult to locate the four discrete lasing sources 5-8 shown in FIG. 3 with such accuracy that no mechanical misalignment is present. It is therefore, desirable to electronically correct for mechanical misalignment errors in discrete laser source printheads in order to avoid expensive laser chip placement systems and/or dynamically adjustable chip placement systems in such printheads.

Figure 5:
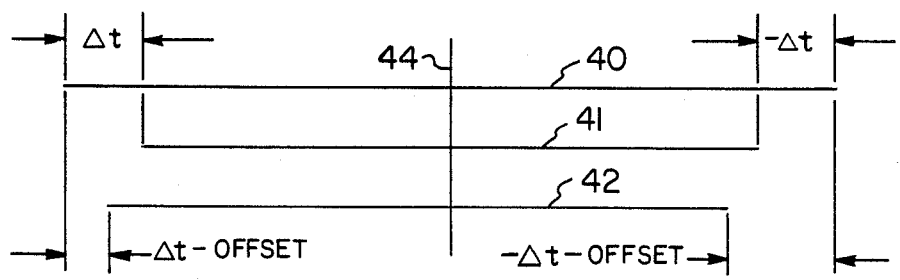
FIG. 5 shows the effect of mechanical offset and chromatic aberrations from scan line to scan line.

FIG. 5 illustrates the effect of mechanical and chromatic aberrations in the production of scan lines. If scan line 40 (which may be produced by laser beam 20, FIG. 4) is chosen as the reference scan line, scan line 41 (which may be produced by laser beam 21) exhibits a reduced length relative to scan line 40, but is symmetrical around the center 44 of the scan line 40. Scan line 42 (which may be produced by laser beam 22) exhibits a reduced magnitude relative to scan line 40 and in addition is not symmetrical around the center 44 of the reference scan line 40. This scan line trace shows that scan line 41 exhibits no mechanical misalignment, but is reduced in size due to variations in wavelength between scan line 41 and the reference scan line 40. Differences in wavelength create differences in the amount each beam is refracted as it passes through the lens system shown in FIGS. 2 and 3, since the index of refraction of glass changes with wavelength. As a result, there is a lateral separation between beam 40 and 41 in the scan direction at the image plane. Shown in FIG. 5, if the center pels of each beam line up properly as they do between scan lines 40 and 41, there is a different starting pel position and a different ending pel position for lines printed by the beams. If the wavelength difference is great enough, a serious print quality defect results.

In FIG. 5, scan line 42 is produced by a lasing source of the same wavelength as scan line 41, that is, the length of scan line 42 is equal to the length of scan line 41, however, the two beams do not line up with one another since scan line 42 has been produced by a lasing source which is mechanically out of alignment with the reference scan line 40 and with scan line 41. As a result of the mechanical misalignment, all of the pels in scan line 42 are displaced a constant amount in one direction.

FIG. 5 illustrates that in order to correct the chromatic aberration problem of scan line 41, the scan line must be extended by a time period delta t at the start of scan and similarly expanded by delta t at the end of scan. FIG. 5 illustrates that scan line 42 must be expanded by the time delta t minus the offset at the start of scan, and extended by delta t plus the mechanical offset at the end of scan.

Figure 6:
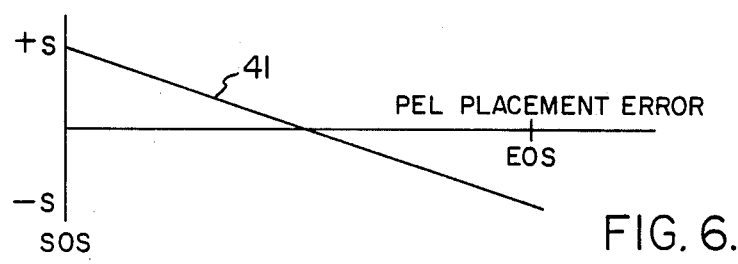
FIG. 6 is an illustration of pel placement errors for a scan line exhibiting chromatic aberration.

FIG. 6 illustrates pel placement error across the scan from start of scan to end of scan for scan line 41. FIG. 6 is an idealized depiction showing a linear change in pel placement across the entire scan, but is suitable for explaining the principles of the invention. In actuality, the pel placement error may be greater from pel to pel toward the edges of the scan than at the center of the scan. In addition, depending upon the optics used in the printhead, the pel placement error may not be symmetrical around the center of the scan, but may vary widely over the scan. Whatever the situation, it can be characterized at manufacture and the principles of this invention can be applied. The simplest case, which is a linear pel placement error, as shown in FIG. 6, will be used to explain the invention.

Figure 7:
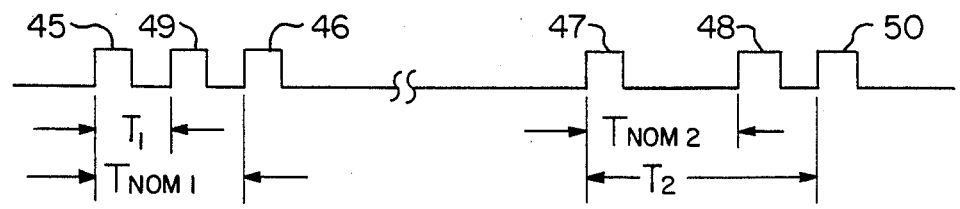
FIG. 7 illustrates signals needed to separate mechanical misalignment errors from chromatic aberrations.

FIG. 7 shows signals produced from the start of scan detector 35, shown in FIGS. 2 and 3, for use in separating the mechanical misalignment error from the chromatic aberration. The technique requires that detector 35 be either a dual detector or a detector with a mask separating the light receiving area into two active regions. The technique also requires a clock that is gated, that is initiated, by the start of scan (SOS) signal. This clock can be the system pel clock as illustrated in this embodiment, but it can be a different precision clock if desired. In this embodiment, one laser is assigned to be the reference laser, for example, the laser which produces scan line 40 in FIG. 5. This laser is powered on to generate a start reference signal 45 and a start of scan (SOS) signal 46. The time period, $Tnom_1$ is measured between these two pulses. Similarly, the reference laser is utilized to generate an end reference signal 47 and an end of scan (EOS) signal 48. The time period, $Tnom_2$ is measured between these two pulses Next, a non-reference laser is enabled to generate start of scan and end of scan pulses. For example, laser 42 in FIG. 5, might be enabled to generate start of scan pulse 49 and end of scan pulse 50. The time period $T_1$ between reference pulse 45 and non-reference start of scan pulse 46 is measured, together with time $T_2$ between end reference pulse 47 and non-reference end of scan pulse 50. With these measurements the mechanical offset is then calculated by the following algorithm.

$$\text{Offset} = \frac{(Tnom_2 - T_2) + (Tnom_1 - T_1)}{2}$$

Note that adding the offset at the start of scan and the offset at the end of scan will result in a total offset of zero if the two offsets are equal. In such case, there is no mechanical offset.

Figure 8:
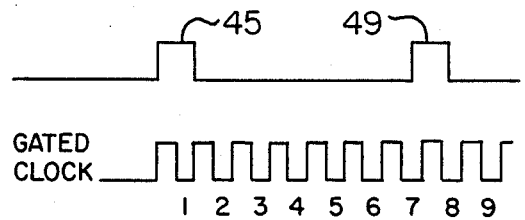
FIGS. 8 and 9 illustrate the circuits used for correcting mechanical misalignment.
Figure 9:
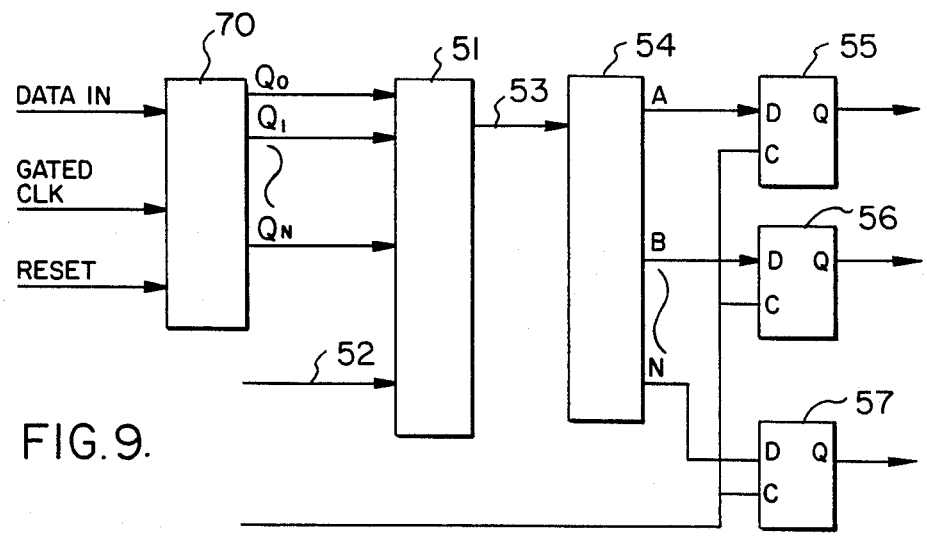

FIGS. 8 and 9 show a preferred technique for correcting the mechanical offset found through the use of the signals generated in FIG. 7. The technique shown measures the difference between the signals 45 and 49, and the difference between the signals 47 and 50 to a sub-pel level FIG. 8 illustrates that a gated clock is gated on by the start reference pulse 45, and that the pulse 49 to be measured occurs at some point during the seventh clock cycle. Instead of using an expensive high frequency clock to measure the difference between clock pulses 7 and 8 to a sub-pel basis, the circuit of FIG. 9 is used, employing a tapped delay line 54 to resolve the time period at which pulse 49 rises during clock pulse 7.

The circuit of FIG. 8 first determines during which cycle of the clock that the event occurs. In this case pulse 49 occurs during the seventh clock cycle. To do that, a signal is shifted through a shift register 70 on each clock cycle. The outputs of the shift register are connected to a multiplexer 51. The control line 52 of the multiplexer determines which cycle the event is tested for, and consequently, the change in serial register output is sensed as occurring during clock cycle 7. The output 53 of multiplexer 51 is connected to a tapped delay line 54. The delay interval between successive taps determines resolution of the final measurement. Consequently, if the resolution of tapped delay line 54 is 2 nanoseconds, then that is the resolution of the final measurement. As a practical note, the total delay of all the taps in delay line 54 should exceed one clock time so that each successive test at a given clock interval overlaps with the previous and succeeding interval. In that manner, should pulse 47 occur near the change of state of the gated clock, it can still be resolved to the sub-pel accuracy of the delay line.

Figure 10:
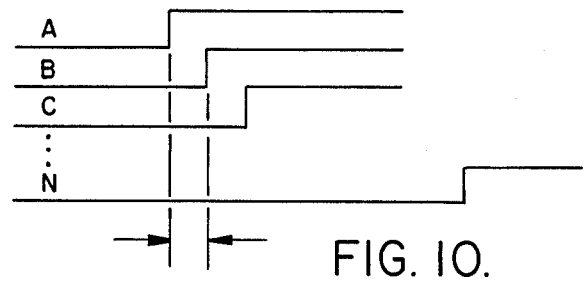

To obtain sub-pel resolution, the selected event, that is pulse 49, initiates a succession of high resolution timing pulses A-N during clock cycle 7, as shown in FIG. 10. These pulses are each of 2 nanosecond duration and are generated through the delay line 54. The event, pulse 49, sets a pattern into the latches 55-57 from which the timing information is determined. For example, if the rise of pulse 49 occurs between tap A and tap B, latch 55 will possess a different setting than taps B-N. The maximum relative resolution is not limited by the performance of the latches since the set up time for the latches is constant from one measurement to another. Therefore, the set-up time falls out of the time measurement when the difference between two measurements is of interest This technique, therefore, determines the rise of pulse 49 relative to pulse 45 within 2 nanoseconds.

What has been described above is the measurement of time interval $T_1$. In a similar manner, time interval $T_2$ is ascertained, together with the time intervals $Tnom_1$ and $Tnom_2$. With all of the measurements needed to implement the calculation of mechanical offset, a controller, not shown, performs the calculation and adjusts pel location by providing a proper delay into the timing of scan line 42, FIG. 5, so as to move that scan line in such a manner that the center of scan line 42 is along the center of reference line 40. By so doing, scan line 42 will take a position exactly like that of scan line 41. With the correction of mechanical offsets in all of the scan lines, it is then necessary to correct for the chromatic aberrations exhibited by scan lines 41 and 42, to expand those scan lines to equal the length of reference scan line 40.

In order to provide chromatic compensation for scan lines 41 and 42, they must be expanded to equal scan line 40. To do that, the mechanical misalignment between scans is corrected as above, and then the relative displacement of the start of scan signals to the reference beam SOS signal is measured This displacement results from wavelength differences and is equal to:

$$\text{Chromatic Error At Start of Scan} = \frac{(Tnom_2 - T_2) - (Tnom_1 - T_1)}{2}$$

Typically, variations in pel placement due to wavelength differences are less than one pel. To provide compensation in the case of a linear pel placement error such as explained with reference to FIG. 6, a periodic delay is placed in the printing of pels throughout the scan. That is to say, if the total scan line is 7,000 pels long, it is 3,500 pels from the start of print to the center of print, where all center pels are aligned. If the total error is measured as ½ pel between the start of scan signals of reference scan line 40 and the scan line 41, and if the requirement is to produce pels which are never more than 1/10th pel out of alignment, a minimum of five corrections are needed over the 3,500 pel length. Therefore, a periodic correction of 1/10th pel is inserted every 700 pels during production of the scan line 41.

FIG. 11 illustrates a circuit to perform the chromatic aberration correction. The pel clock is applied to a multiple tapped delay line 60. The amount of delay between each successive tap determines the resolution of the correction. The various taps A-N are applied to the input of digital multiplexer 61. A control line 62 is provided to select each phase of the pel clock and thereby ascertain the tap at which the change of state occurs in the same fashion described above with reference to FIGS. 8 and 9. A programmable counter 64 and phase select logic 63 can be utilized in the selection process.

In the example described above, if tap F represents the center of print and tap A represents the start of print pel, the delay in output from tap A will equal 0.5 pel from the center of print to a resolution of 2 nanoseconds. Tap B will represent a delay of 0.4 pel from the center of print and will be utilized to provide the delay 700 pels into the scan. Tap C represents a delay of 0.3 pel from the center of scan and will be timed to occur 1,400 pels into the scan. In a similar manner, corrections of 1/10th pel are placed into the line at 2,100 pels and at 2,800 pels. On the trailing side of the center of print, similar corrections are made to the pel clock.

In the case where pel placement is not symmetric around the center of print, a table can provide the pel count at which delays are to be implemented. Note also that scan lines can be magnified with respect to the reference creating a need for line contraction rather than expansion. The technique is the same except that the pel clock pulse is moved incrementally forward in accordance with the selected tap.

As mentioned previously, the wavelength of a laser can vary with time and temperature, therefore, the tap which best corrects for the relative error can change over time. With reference to FIG. 7, this means that there can be a drift in the start reference pulse 45 and there can be a drift in the position of pulse 49 representing the start of scan pulse for scan line 42. As a result, the corrections needed can change with time and temperature.

Therefore, the circuits of FIGS. 8 and 11 are enabled to select the tap to be used in accordance with the detection of the reference start of scan and the start of scan for the non-reference laser periodically throughout machine use. In that manner, the correction is a dynamic correction which adapts to changes as the pulse positions shift.

While the invention has been shown and described with reference to a preferred embodiment, it will be understood that changes in the form and details of the invention may be made therein without departing from the spirit and scope of the invention. For example, a grating system could be used for generating reference pulses and all scan lines can be adjusted accordingly.

What is claimed is:

1. A method of correcting the picture element (pel) placement process to compensate for mechanical misalignment from laser beam to laser beam in the scan direction in a multiple beam laser scanning system comprising the steps of:
   producing a start reference pulse with a reference laser beam;
   producing a reference start of scan (SOS) pulse with said reference beam;
   producing a reference end of scan (EOS) pulse with said reference laser beam;
   producing an end reference pulse with said reference laser beam;
   measuring the time period, $Tnom_1$, between said start reference pulse and said reference SOS pulse and measuring the time period, $Tnom_2$, between said end reference pulse and said reference EOS pulse;
   producing a non-reference SOS pulse with a non-reference laser beam;
   measuring the time period $T_1$ between said start reference pulse and said non-reference SOS pulse;
   producing a non-reference EOS pulse with said non-reference laser beam;
   measuring the time period $T_2$ between said end reference pulse and said non-reference EOS pulse;
   calculating the mechanical offset of said non-reference laser beam relative to said reference laser beam according to the following relationship:

$$\text{Mechanical Offset} = \frac{(Tnom_2 - T_2) + (Tnom_1 - T_1)}{2}$$

altering the start of scan for said non-reference laser beam to correct for said offset relative to the start of scan for said reference beam.

2. The method of claim 1 wherein the step of measuring the time period $T_1$ further includes the steps of:
   producing clock pulses gated to said start reference pulse, and determining the number of whole clock pulses during period $T_1$;
   producing a succession of incremental pulses of equal duration during the clock pulse following the last whole clock pulse during period $T_1$;
   determining the number of incremental pulses during period $T_1$; and
   adding the number of whole clock pulses to the number of incremental pulses to obtain a measure of period $T_1$.

3. The method of claim 2 wherein the step of measuring time period $T_2$ follows the same procedure as the measurement of period $T_1$.

4. The method of claim 3 wherein said nominal time period are measured according to the procedure set out for measuring period $T_1$.

5. A method of correcting the picture element (pel) placement process to compensate for chromatic aberrations occurring from laser beam to laser beam in the scan direction in a multiple beam laser scanning system comprising the steps of:
   measuring the displacement time between the reference beam start of scan (SOS) signal and the non-reference beam SOS signal;
   inserting the appropriate delay to align the two SOS signals; and
   producing the scan line with additional delays at selected intervals to maintain pel placement accuracy within a desired tolerance across the entire scan line.

6. The method of claim 5 wherein the step of measuring the displacement time period between SOS signals further includes the steps of:
   producing clock pulses gated to said reference beam start of scan signal;
   determining the number of whole clock pulses during said displacement time period;
   producing a succession of incremental pulses of equal duration during the clock pulse following the last whole clock pulse during said displacement period;
   determining the number of incremental clock pulses during said displacement time period; and
   adding the whole number of clock pulses to the number of incremental pulses to obtain a measure of said displacement time period.

7. The method of claim 6 wherein the steps of determining the number of clock pulses and incremental pulses during said displacement time is found according to the relationship:

$$\text{Chromatic Error At Start of Scan} = \frac{(Tnom_2 - T_2) - (Tnom_1 - T_1)}{2}$$

8. A method of correcting the picture element (pel) placement process to compensate for mechanical misalignment and for chromatic aberrations from laser beam to laser beam in the scan direction of a multiple beam laser scanning system comprising the steps of:
- obtaining a measure of the mechanical misalignment for each beam;
- correcting for said mechanical misalignment;
- obtaining a measure of the chromatic aberration for each beam; and
- correcting for said chromatic aberration.

9. The method of claim 8 wherein said steps of obtaining a measure of the mechanical misalignment and correcting for said misalignment includes the steps of:
- producing a start reference pulse with a first reference laser beam;
- producing a reference start of scan (SOS) pulse with said reference beam;
- producing a reference end of scan (EOS) pulse with said reference laser beam;
- producing an end reference pulse with said reference laser beam;
- measuring the time period, $Tnom_1$, between said start reference pulse and said reference SOS pulse and measuring the time period, $Tnom_2$, between said end reference pulse and said reference EOS pulse;
- producing a non-reference SOS pulse with a non-reference laser beam;
- measuring the time period $T_1$ between said start reference pulse and said non-reference SOS pulse;
- producing a non-reference EOS pulse with said non-reference laser beam;
- measuring the time period $T_2$ between said end reference pulse and said non-reference EOS pulse;
- calculating the mechanical offset of said non-reference laser beam relative to said reference laser beam according to the following relationship:

$$\text{Mechanical Offset} = \frac{(Tnom_2 - T_2) + (Tnom_1 - T_1)}{2}$$

- altering the start of scan for said non-reference laser beam to correct for said offset relative to the start of scan for said reference beam.

10. The method of claim 9 wherein the step of measuring the time period $T_1$ further includes the steps of:
- producing clock pulses gated to said start reference pulse;
- determining the number of whole clock pulses during period $T_1$;
- producing a succession of incremental pulses of equal duration during the clock pulse following the last whole clock pulse during period $T_1$;
- determining the number of incremental pulses during period $T_1$; and
- adding the number of whole clock pulses to the number of incremental pulses to obtain a measure of period $T_1$.

11. The method of claim 10 wherein the step of measuring time period $T_2$ follows the same procedure as the measurement of period $T_1$.

12. The method of claim 11 wherein said nominal time period is measured according to the procedure set out for measuring period $T_1$.

13. The method of claim 8 wherein said steps of obtaining a measure of the chromatic aberration for each beam and correcting for chromatic aberration includes the steps of:

- measuring the displacement time between the reference beam start of scan (SOS) signal and the non-reference beam SOS signal;
- inserting the appropriate delay to align the two SOS signals; and
- producing scan lines with additional delays at selected intervals to maintain pel placement accuracy with a desired tolerance across the entire scan line.

14. The method of claim 13 wherein the step of measuring the displacement time period between SOS signals further includes the steps of:
- producing clock pulses gated to said reference beam start of scan signal;
- determining the number of whole clock pulses during said displacement time period;
- producing a succession of incremental pulses of equal duration during the clock pulse following the last whole clock pulse during said displacement period;
- determining the number of incremental clock pulses during said displacement time period; and
- adding the whole number of clock pulses to the number of incremental pulses to obtain a measure of said displacement time period.

15. The method of claim 14 wherein the steps of determining the number of clock pulses and incremental pulses during said displacement time is found according to the relationship:

$$\text{Chromatic Error At Start of Scan} = \frac{(Tnom_2 - T_2) - (Tnom_1 - T_1)}{2}$$

16. The method of claim 8 wherein said steps further include:
- producing a start reference pulse with a reference laser beam;
- producing a reference start of scan (SOS) pulse with said reference beam;
- producing a reference end of scan (EOS) pulse with said reference laser beam;
- producing an end reference pulse with said reference laser beam;
- measuring the time period, $Tnom_1$, between said start reference pulse and said reference SOS pulse and measuring the time period, $Tnom_2$, between said end reference pulse and said reference EOS pulse;
- producing a non-reference SOS pulse with a non-reference laser beam;
- measuring the time period $T_1$ between said start reference pulse and said non-reference SOS pulse;
- producing a non-reference EOS pulse with said non-reference laser beam;
- measuring the time period $T_2$ between said end reference pulse and said non-reference EOS pulse;
- calculating the mechanical offset of said non-reference laser beam relative to said reference laser beam according to the following relationship:

$$\text{Mechanical Offset} = \frac{(Tnom_2 - T_2) + (Tnom_1 - T_1)}{2}$$

altering the start of scan for said non-reference laser beam to correct for said offset relative to the start of scan for said reference beam;
- measuring the displacement time between the reference beam start of scan (SOS) signal and the SOS signal for the beam to be corrected;

inserting the appropriate delay to align the two SOS signals;

producing scan lines with additional delays at selected intervals to maintain pel placement accuracy with a desired tolerance across the entire scan line.

17. The method of claim 16 wherein the step of measuring the time period $T_1$ further includes the steps of:

producing clock pulses gated to said start reference pulse;

determining the number of whole clock pulses during period $T_1$;

producing a succession of incremental pulses of equal duration during the clock pulse following the last whole clock pulse during period $T_1$;

determining the number of incremental pulses during period $T_1$; and adding the number of whole clock pulses to the number of incremental pulses to obtain a measure of period $T_1$.

18. The method of claim 17 wherein the step of measuring time period $T_2$ follows the same procedure as the measurement of period $T_1$.

19. The method of claim 18 wherein said nominal time period is measured according to the procedure set out for measuring period $T_1$.

20. The method of claim 19 wherein the step of measuring the displacement time period between SOS signals further includes the steps of:

producing clock pulses gated to said reference beam start of scan signal;

determining the number of whole clock pulses during said displacement time period;

producing a succession of incremental pulses of equal duration during the clock pulse following the last whole clock pulse during said displacement period;

determining the number of incremental clock pulses during said displacement time period; and adding the whole number of clock pulses to the number of incremental pulses to obtain a measure of said displacement time period.

21. The method of claim 20 wherein the steps of determining the number of clock pulses and incremental pulses during said displacement time is found according to the relationship:

$$\text{Chromatic Error At Start of Scan} = \frac{(T_{nom_2} - T_2) - (T_{nom_1} - T_1)}{2}$$

* * * * *